United States Patent
Almassy (10) Patent No.: US 7,142,841 B1
(45) Date of Patent: Nov. 28, 2006

(54) TELEPHONE PERSONAL INFORMATION MANAGER

(75) Inventor: Nikolaus P. W. Almassy, San Diego, CA (US)

(73) Assignee: Texas Instruments Incorporated, Dallas, TX (US)

(*) Notice: Subject to any disclaimer, the term of this patent is extended or adjusted under 35 U.S.C. 154(b) by 976 days.

(21) Appl. No.: 09/672,359

(22) Filed: Sep. 28, 2000

(51) Int. Cl.
*H04M 11/10* (2006.01)

(52) U.S. Cl. .................. 455/412.1; 455/415; 455/458; 379/88.18; 379/88.19; 379/88.22

(58) Field of Classification Search ............ 455/412.1, 455/412.2, 413, 415, 458, 567; 379/70, 88.18, 379/88.19, 88.21, 88.25, 93.03, 179, 183, 379/207.14, 207.15, 214.01
See application file for complete search history.

(56) References Cited

U.S. PATENT DOCUMENTS

| | | | | |
|---|---|---|---|---|
| 4,894,649 A | * | 1/1990 | Davis ..................... 340/7.39 |
| 4,942,598 A | * | 7/1990 | Davis ..................... 340/7.31 |
| 5,029,196 A | | 7/1991 | Morganstein ............... 379/67 |
| 5,063,588 A | * | 11/1991 | Patsiokas et al. ........... 340/7.1 |
| 5,327,486 A | | 7/1994 | Wolff et al. ................ 379/96 |
| 5,329,578 A | * | 7/1994 | Brennan et al. ........ 379/211.03 |
| 5,452,354 A | | 9/1995 | Kyronlahti et al. ......... 379/375 |
| 5,475,739 A | * | 12/1995 | Norimatsu ................. 379/70 |
| 5,559,860 A | * | 9/1996 | Mizikovsky ............... 455/413 |
| 5,673,313 A | | 9/1997 | Kato ....................... 379/373 |
| 5,845,219 A | | 12/1998 | Henriksson ............... 455/567 |
| 5,881,147 A | | 3/1999 | Kim ........................ 379/373 |
| 5,999,606 A | | 12/1999 | Weishut et al. ............ 379/199 |
| 6,094,587 A | | 7/2000 | Armanto et al. ........... 455/567 |
| 6,377,664 B1 | * | 4/2002 | Gerszberg et al. ......... 379/88.13 |
| 6,389,277 B1 | * | 5/2002 | Salzwedel ................ 455/414.1 |
| 6,449,475 B1 | * | 9/2002 | Chinnaswami ............. 455/415 |
| 6,493,548 B1 | * | 12/2002 | Kinoshita ................. 455/412.1 |
| 6,711,402 B1 | * | 3/2004 | Chelliah et al. ............ 455/415 |
| 2001/0028709 A1 | * | 10/2001 | Makela et al. ........... 379/214.01 |
| 2001/0036254 A1 | * | 11/2001 | Davis et al. ................ 379/67.1 |
| 2002/0058500 A1 | * | 5/2002 | Higuchi et al. ............. 455/412 |
| 2002/0107015 A1 | * | 8/2002 | Menzel ..................... 455/426 |
| 2002/0114436 A1 | * | 8/2002 | Cannon et al. ........... 379/142.01 |
| 2002/0137503 A1 | * | 9/2002 | Roderique ................. 455/420 |

FOREIGN PATENT DOCUMENTS

| | | |
|---|---|---|
| EP | 0 862 342 A | 9/1998 |
| EP | 0 901 263 A | 3/1999 |
| EP | 0 991 249 A | 4/2000 |
| GB | 2 333 209 A | 7/1999 |
| WO | WO 9744981 A1 * | 11/1997 |
| WO | WO 99/30298 | 6/1999 |

\* cited by examiner

*Primary Examiner*—William Trost
*Assistant Examiner*—James D. Ewart
(74) *Attorney, Agent, or Firm*—Wade James Brady, III; Frederick J. Telecky, Jr.

(57) ABSTRACT

A personal information manager (PIM) has been provided for use in controlling telephone call message responses for a wireless communications network mobile station telephone. The PIM permits a telephone user to program a unique response for each calling party. Typical responses including the normal audible alert, automatically transferring the call to voice mail, and silent ringing with no voice mail, to name but a few options. In addition, the matrix of calling parties and corresponding message responses can be modified for different times of the day or circumstances. For example, the PIM can be programmed to deliver a different set of responses during normal work hours than the responses provided at night, or during a business meeting.

33 Claims, 4 Drawing Sheets

MESSAGE RESPONSE HIERARCHY

| PRIORITY GROUP HIERARCHY | MESSAGE RESPONSE GROUP X | MESSAGE RESPONSE GROUP Y | MESSAGE RESPONSE GROUP Z |
|---|---|---|---|
| PRIORITY GROUP 1 | RESPONSE A | RESPONSE B | RESPONSE C |
| PRIORITY GROUP 2 | RESPONSE B | RESPONSE C | RESPONSE n |
| ∘∘∘ | ∘∘∘ | ∘∘∘ | ∘∘∘ |
| PRIORITY GROUP n | RESPONSE n | RESPONSE n+1 | RESPONSE n+1 |
| OVERRIDE PRIORITY GROUP | RESPONSE A | RESPONSE A | RESPONSE A |
| SPECIAL IDENTITY 1 | RESPONSE A | RESPONSE B | RESPONSE C |

FIG. 1

| PRIORITY GROUP | CALLING PARTY IDENTITIES | | | |
|---|---|---|---|---|
| PRIORITY GROUP 1 | BOB JONES | ALBERT SMITH | 858-272-XXXX | |
| PRIORITY GROUP 2 | HENRY LEE | 716-XXX-XXXX | | |
| ⋮ | ⋮ | ⋮ | ⋮ | ⋮ |
| PRIORITY GROUP n | WANDA SIMS | CALLER ID BLOCKED | | |
| OVERRIDE PRIORITY GROUP | WANDA SIMS | BOB JONES | SECURITY CODE | |
| SPECIAL IDENTITY 1 | HENRY LEE | | | |

FIG. 2

MESSAGE RESPONSE HIERARCHY

| PRIORITY GROUP HIERARCHY | MESSAGE RESPONSE GROUP X | MESSAGE RESPONSE GROUP Y | MESSAGE RESPONSE GROUP Z |
|---|---|---|---|
| PRIORITY GROUP 1 | RESPONSE A | RESPONSE B | RESPONSE C |
| PRIORITY GROUP 2 | RESPONSE B | RESPONSE C | RESPONSE n |
| ⋮ | ⋮ | ⋮ | ⋮ |
| PRIORITY GROUP n | RESPONSE n | RESPONSE n+1 | RESPONSE n+1 |
| OVERRIDE PRIORITY GROUP | RESPONSE A | RESPONSE A | RESPONSE A |
| SPECIAL IDENTITY 1 | RESPONSE A | RESPONSE B | RESPONSE C |

*FIG. 3*

| TIME | MESSAGE RESPONSE GROUP |
|---|---|
| 7AM–8AM | Y |
| 8AM–NOON | X |
| NOON–6PM | Y |
| 6PM–7AM | Z |

TELEPHONE PERSONAL INFORMATION MANAGER

BACKGROUND OF THE INVENTION

1. Field of the Invention

This invention relates generally to telephonic communications and, more particularly, to a personal information manager that organizes telephone call message responses in reaction to such factors as the calling party identity, time of day, and activity level.

2. Description of the Related Art

In most state of the art telephones, including mobile station and landline telephones, the identity of the calling party can be established before the telephone is answered. The telephones have access to the current time through the same mechanism (Caller ID). Telephones also have programmable ring tone features. Although a telephone can be individually customized using these mechanisms, there are few features available to permit a telephone to react in response to the identity of the calling party or the time of day. Where these features are available, at least one user-directed or manual step is required in the process. For example, few methods exist to conveniently, automatically, or programmably modify the phone's alerting methods. Neither are there programmable methods of redirecting voice mail based on the user's preferences or calendar entries. Instead, the change of the alerting method must be manually performed each time by the user. The redirection to a voice mail system can typically only be achieved when the telephone is in use, or not answered within a certain number of rings. No convenient method exists for modifying the voice mail system to respond differently for different callers or different times of day.

It would be advantageous if a telephone user could program a telephone to respond differently for different situations.

It would be advantageous if a telephone could be programmed to respond uniquely to each caller.

It would be advantageous if a telephone could be programmed to respond in reaction to the time of day.

It would be advantageous if a telephone could modify its behavior and message response in reaction to external events, without immediate user intervention. To that end, it would be advantageous if a telephone's audible ringer could be silenced during times previously selected by the user. Also, it would desirable if calls could be blocked from a first class of identified calling parties, while other calls permitted to ring through from a second group of identified calling parties.

SUMMARY OF THE INVENTION

Accordingly, a mobile station telephone is provided with data transfer and caller identification capabilities, that is able to modify its response to incoming calls based on external events, such as calendar entries, and the identity of the calling party. A software module, external or internal to the mobile station, with appropriate memory serves as a personal information manager (PIM). The PIM modifies the mobile station's method of alerting the user of an incoming call, depending on the user's preferences. These preferences can be selected by the phone's user through a user interface that is external or embedded into the phone by combining basic settings regarding alerting and answering methods, such as audible or vibrating answer, voice mail, or busy signal. The user interface information database acts as a calendar, time management system, or secretary.

A method is also provided for a mobile station to control the receipt of messages. The method comprises: creating a group of message responses; identifying a calling party; selecting a message response from the group of message responses, in reaction to the identity of the calling party; and, supplying the selected message response.

In some aspects of the invention, the message response groups change in reaction to external factors, such as the time of day, communication activity level, or manual selection. Then, the method further comprises: creating a plurality of message response groups; and, selecting a message response group from the plurality of message response groups.

Creating a group of message responses includes creating a hierarchy of message responses. Then, the method further comprises: creating a hierarchy of priority groups; inserting calling party identities into the priority groups; creating a matrix of the priority group hierarchy cross-referenced to the message response hierarchy; in response to identifying a calling party, locating the calling party in a priority group; and, selecting a message response in reaction to locating the priority group.

DETAILED DESCRIPTION OF THE PREFERRED EMBODIMENTS

Figure 1:
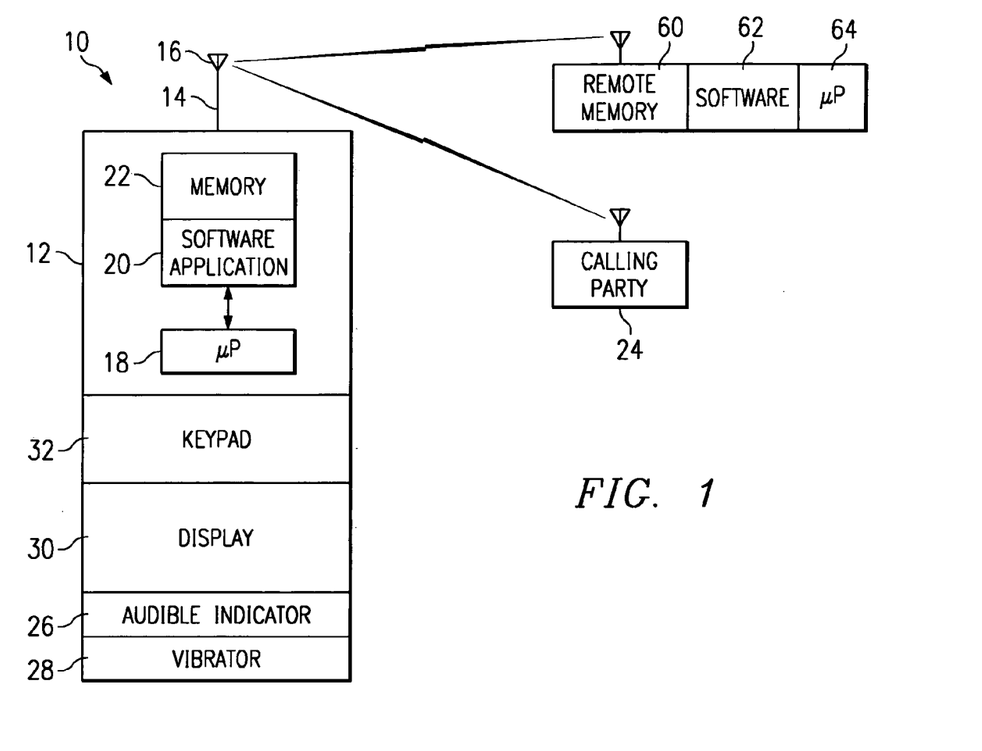
FIG. 1 is a schematic block diagram illustrating the present invention system for controlling the receipt of messages in a wireless communications network.

FIG. 1 is a schematic block diagram illustrating the present invention system for controlling the receipt of messages in a wireless communications network. The system 10 comprises a mobile station 12 having a wireless communications port to accept calls on line 14, through antenna 16. The mobile station 12 including a microprocessor 18, a software application of machine executable instructions 20, and a memory 22 with a group of message responses. The mobile station 12 identifies a calling party 24, communicating through the wireless network, selects a message response from the group of message responses in memory 22, in reaction to the identity of the calling party 24. As explained in more detail below, many of the elements identified with the mobile station can be located, and their functions performed, at a remote site.

The mobile station 12 includes an audible indicator 26 for audio alerting, a vibrator indicator 28 for vibration alerting, and a visual display indicator 30 for visual alerting. Thus, the possible message responses include alerting, not alerting, responding with a busy signal, not alerting and recording the message, and forwarding the call to another telephone. Other responses are also possible and the present invention is not necessarily limited to the above-mentioned examples.

One feature of the present invention permits the message response group stored in memory 22 to be a message response group selected from the plurality of message response groups. That is, different message response groups can exist for different situations. For example, the mobile station can be programmed to have a different set of responses in the morning than it has in the afternoon. The message response group, stored in memory 22, is selected in reaction to factors including the time of day, communication activity level, and manual selection. A keyboard 30 creating a signal with configuration of keys, and/or a switch (not shown) can enable the mobile station 12 to manually trigger a change in the stored message response group.

Figure 2:
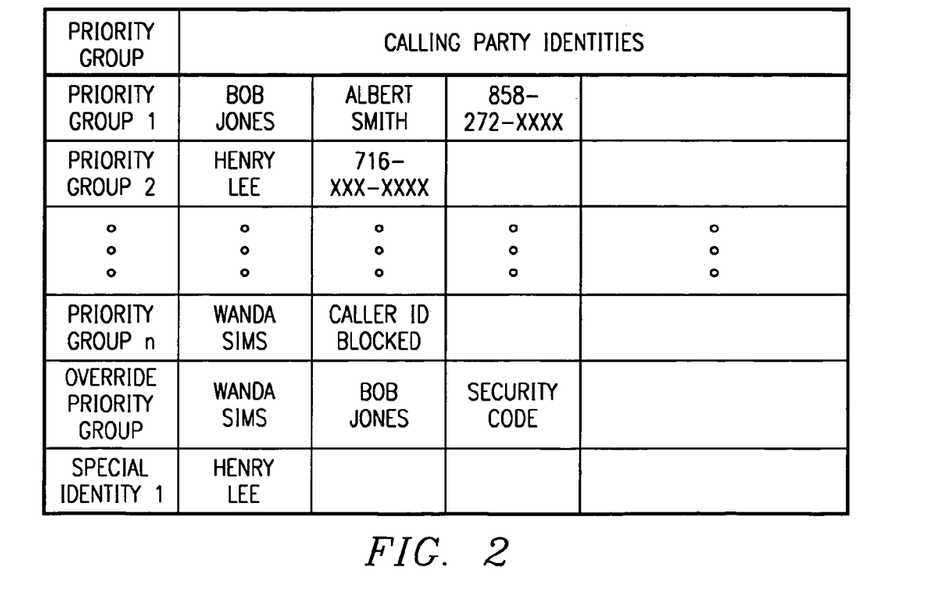
FIG. 2 is a block diagram illustrating a priority group list, such as may be stored in memory for use by the mobile station of FIG. 1.

FIG. 2 is a block diagram illustrating a priority group list, such as may be stored in memory for use by the mobile station of FIG. 1. The priority group list includes a plurality of priority groups. Priority groups one, two, and n are specifically shown, where the dotted lines separating priority group two form priority group n are intended to represent any additional number of priority groups in the list. The present invention is not limited to any particular number of priority groups. Certain calling party identities, such as Bob Jones or selected telephone exchange numbers, are assigned to priority group one. The list is organized so that the entities in priority group one have a higher priority than the entities in priority group two, and group two has a higher priority than group n.

In some aspects of the invention, the wireless communication network provides Caller ID services. Then, the mobile station 12 identifies the calling party using the Caller ID services provided by the wireless communications network. Alternately, the mobile station software application 20 identifies a calling party from factors including the complete phone number, local area exchange, area code, the calling party having an unknown number, and the calling party having a blocked number. For example, an unknown or blocked ID number may be put in the lowest priority group n. Certain local exchange numbers or area codes may be given higher priority than other numbers or Caller IDs.

Figure 3:
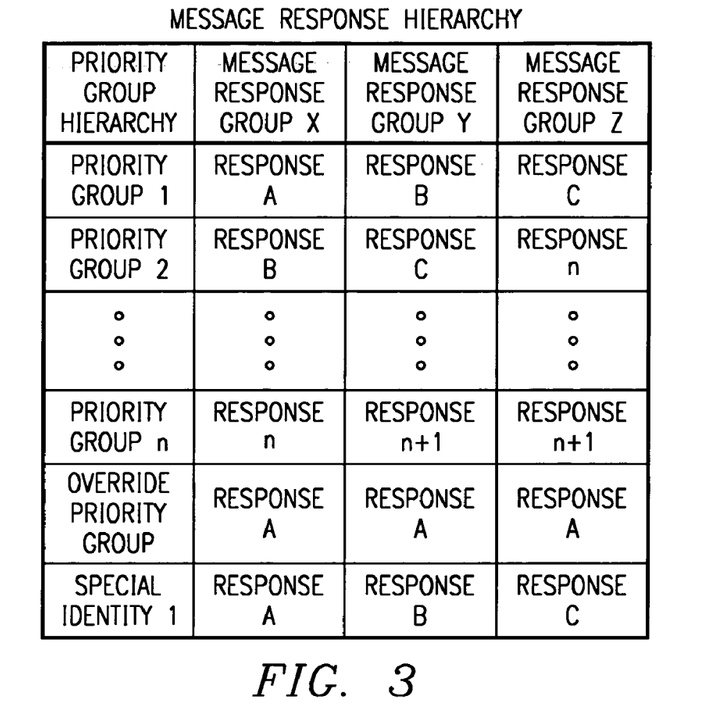
FIG. 3 is a block diagram illustrating a priority group hierarchy cross-referenced with a message response hierarchy, to form a priority group-message response matrix.

FIG. 3 is a block diagram illustrating a priority group hierarchy cross-referenced with a message response hierarchy, to form a priority group-message response matrix. The mobile station software application 20 (see FIG. 1) creates a matrix of the priority group hierarchy cross-referenced to message response hierarchy. First, the software application locates the calling party in a priority group. In response to the calling party being identified, a message response is selected in reaction to locating the priority group. For example, returning briefly to FIG. 2, the caller is identified as Bob Jones. Therefore, the calling party is located in priority group one. Returning to FIG. 3, since the caller is located in priority group one, response A is selected. Response A might be to alert the mobile station user using the audible alert.

In some aspects of the invention, the priority group-message response matrix includes an override message response. This is a message response that a selected group of callers is able to trigger, bypassing the normal process of locating the caller in a priority group and providing a message response in reaction to the priority group. The mobile station software application provides the override message response, which bypasses the message response that would normally have been selected in reaction to locating the priority group. As shown in FIG. 3, the message group X override response is response A, which may be to ring the call through using the audible alert. Returning to FIG. 2, an override priority group is shown including calling parties with the authority to trigger the override message response. Further, a code word identity is shown so that the override response can be triggered when the mobile station receives a calling party security code. Thus, override priority calling parties such as Wanda Sims, who are normally given message response n, can enter a code word or supply some other kind of stimulus to trigger the override response. In some aspects of the invention even an unknown or unclassified caller is permitted override priority as long as the security code is provided.

In some aspects of the invention, other message response bypasses are available. Returning to FIG. 1, the software application 20 shows the identity of the calling party on the display 30, regardless of the message response selected. The display presents the call to the user in an unobtrusive manner, so that the user can bypass the automatic mechanism which provides a message response in reaction to locating the caller identity in a priority group. Other non-obtrusive alert mechanisms could also be used, such as a single vibration pulse or a single ring.

In some aspects of the invention, the software application 20 adds special identities to the hierarchy of priority groups (see FIG. 2) and cross-references the special identities to message responses (see FIG. 3). The software application locates a calling party identity in the special identities, for example Henry Lee is located as a special identity. A special identity message response is then given in reaction to locating the special identity, prior to locating the calling party identity in a priority group and providing a message response in the normal manner of the invention. This feature may be used for temporary circumstances. For example, if the mobile station user knows that Henry Lee will be on vacation for the next two weeks, an assumption can be made that any calls received from Henry Lee in that two week period will be urgent. Therefore, Henry Lee will receive a response A instead of the normal process response B. After the two week vacation, Henry Lee can be removed as a special identity and will receive the message response accorded a caller located in priority group two. This features saves the user from having to edit the caller identities in the priority groups.

As shown in FIG. 3, a memory can be maintained for a plurality of message response hierarchies. Message response group X, message response group Y, and message response group Z are shown, but the invention is not limited to any particular number. As a result, a priority group-message response matrices are formed, where the priority group hierarchy is cross-referenced against each of the plurality of message response hierarchies. Therefore, a particular priority group-message response matrix must first be identified for use in cross-referencing the located priority group. The matrix to be used is programmable by the mobile station user.

Figure 4:
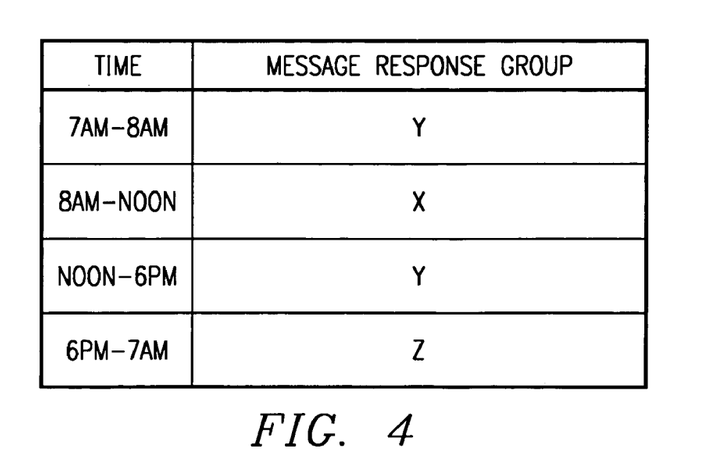
FIG. 4 illustrates a program used to select a priority group-message response matrix.

FIG. 4 illustrates a program used to select a priority group-message response matrix. For example, the user may select the message response group Y responses from 7 AM to 8 AM for the morning commute, and between 12 PM and 6 PM for lunch, afternoon meetings, and the commute home. Message response group X can be selected from 8 AM to 12 PM for the normal office routine, and message group Z selected from 6 PM to 7 AM, when the user is home.

Returning to FIG. 1, in one aspect of the invention, the mobile station memory 22 maintains the priority group-message response matrices, and the software application 20 determines which matrix is the be used. Alternately, the priority group-message response matrices can be maintained at a remote memory 60 having a port to transmit wireless communications with the mobile station. The remote memory 60 can be a service offered by the wireless service provider, or a computer and telephone combination that the mobile station user maintains at home or at work.

Then, the mobile station 12 port accepts a priority group-message response matrix transmitted by the remote memory 60 for storage in the mobile station memory 22. Thus, the mobile station need only store the priority group-message response matrix that is currently in use, so that the mobile station memory and software functions can be simplified.

For example, in some aspects of the invention, the mobile station software application 20 periodically requests the current priority group-message response matrix using a wireless transmission through the communications port. The remote memory 60 transmits the current priority group-message response matrix to the mobile station 12 in response to the request. The mobile station 12 may request the priority group-message response matrix by transmitting a wireless message selected from the group including short message service (SMS) and general message service. Likewise, the remote memory 60 transmits the priority group-message response matrix by wireless communication messages selected from the group including SMS and general message service. A general message service can include data network subscriber protocols such as WAP and HTTP.

Alternately, a switch 30 or keystroke combination may be used to manually request the transmission of the priority group-message response matrix from the remote memory 60. In another aspect, the remote memory 60 is accessible via an Internet address, to receive requests for priority group-message response matrix updates. Then, the mobile station software application 20 includes a lightweight browser to request the current priority group-message response matrix, via a wireless communications from the remote memory having the Internet address.

The mobile station browser 20 can also be used to access the remote memory 60 for the purpose of editing the matrices, modifying the relationships between a priority group and a message response, or the relationship between a calling party identity and a priority group. Alternately, it may be easier to perform edits of the priority group-message response matrices in remote memory 60 through a landline Internet connection to a personal computer.

Further, a message response software application 62 and microprocessor 64 can be stored and maintained at the remote site, in some aspects of the invention. Thus, the matrices are stored in remote memory 60. The remote software application 62 selects the matrix to be used, locates the identified caller in a priority group, and provides a message response in reaction the priority group. The remote site software application 62 provides a signal to the mobile station 12 that communicates the selected message response. In some aspects the remote site also identifies the caller. Alternately, the mobile station 12 supplies the calling party identity to the remote site.

Although the message control and response system of the present invention has been explained above in the context of a wireless communications network, it is also applicable to landline telephones. In a landline system, the various software, memory, and display functions could be enabled in a mechanism connected to the telephone. Alternately, the handset could be built to incorporate some of the control and response functions. Further, the landline service provider could enable some, or all, of the message response control functions.

Figure 5A:
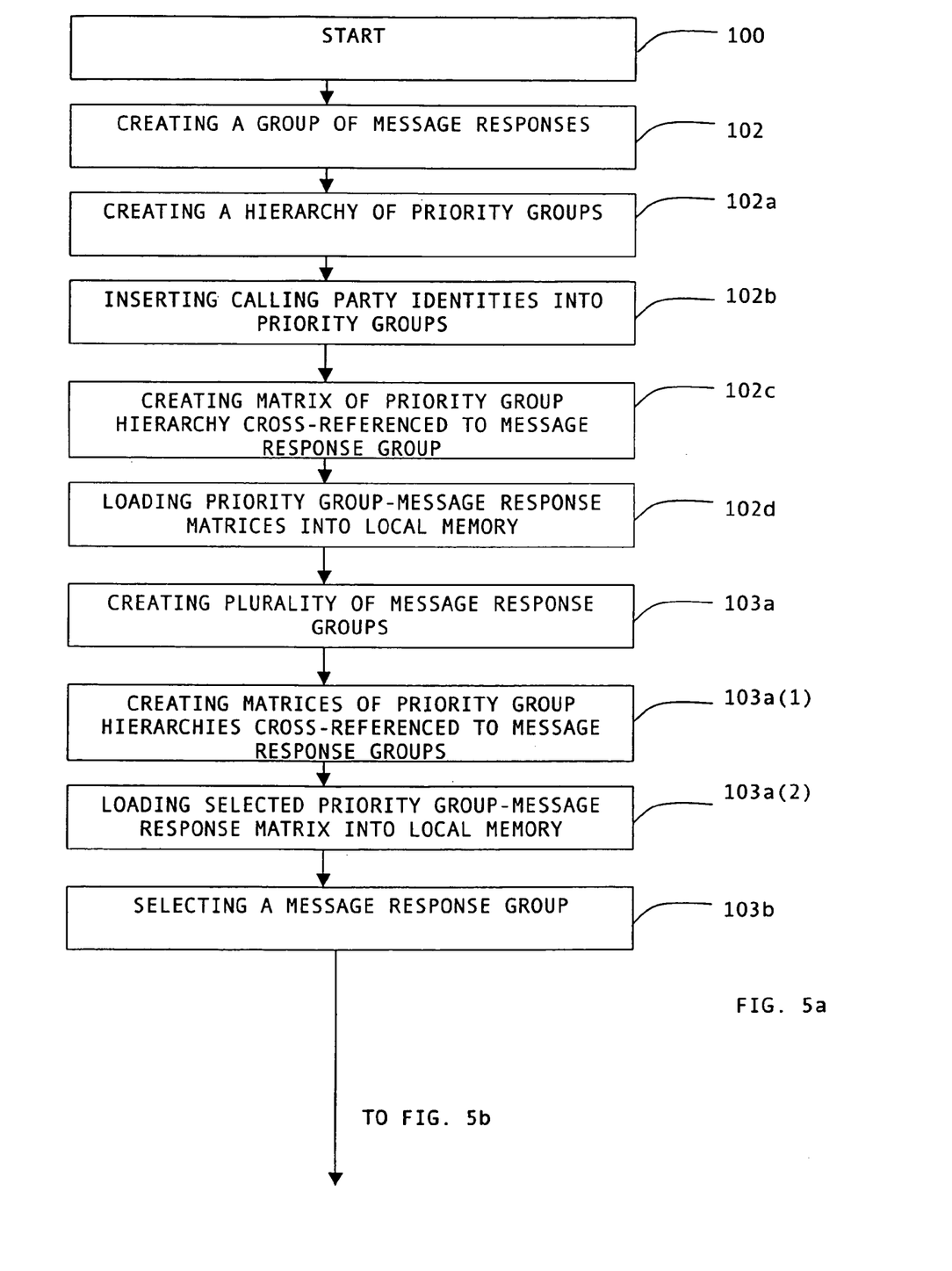
FIGS. 5a and 5b is a flowchart illustrating the present invention method for a mobile station to control the receipt of messages in a wireless communications network.
Figure 5B:
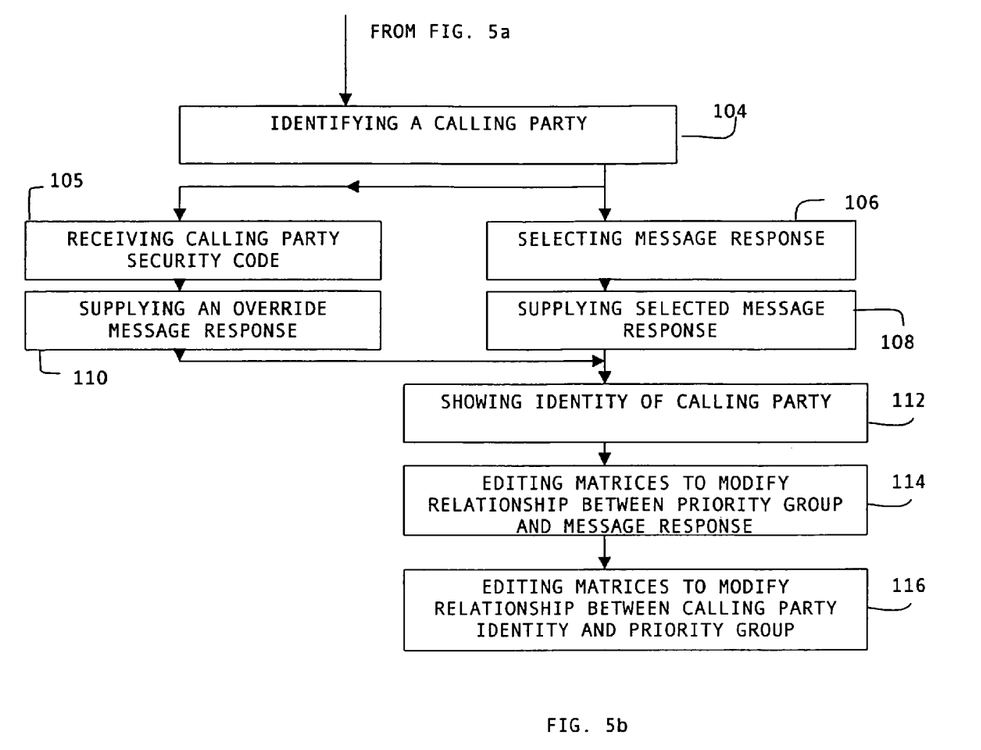

FIGS. 5*a* and 5*b* is a flowchart illustrating the present invention method for a mobile station to control the receipt of messages in a wireless communications network. Although the method is depicted as a sequence of numbered steps for clarity, no order should be inferred from the numbering unless explicitly stated. Step 100 is the start of the method. Step 102 creates a group of message responses. Creating a group of message responses in Step 102 includes creating message responses selected from the group including audio alerting, visually alerting, vibration alerting, not alerting and responding with a busy signal, not alerting and recording the message, and forwarding the call to another telephone. Step 104 identifies a calling party. In some aspects the wireless communication system provide Caller ID services. Then, identifying the calling party in Step 104 includes using the Caller ID service to identify the calling party. Alternately, identifying a calling party includes determining a calling party identity from factors including the complete phone number, local area exchange, area code, unknown number, and blocked number. Step 106 selects a message response from the group of message responses, in reaction to the identity of the calling party. Step 108 supplies the selected message response.

Some aspects of the invention include further steps. Step 103*a* creates a plurality of message response groups. Step 103*b* selects a message response group from the plurality of message response groups. As discussed above in the explanation of FIGS. 1–4, different message response groups are created for use in different times of the day, or in different circumstances. That is, selecting a message response group from the plurality of message response groups in Step 103*b* includes selecting a message response group in reaction to factors including the time of day, communication activity level, and manual selection.

Creating a group of message responses in Step 102 typically includes creating a hierarchy of message responses. Then, the method comprises further steps. Step 102*a* creates a hierarchy of priority groups. Step 102*b* inserts calling party identities into the priority groups. Step 102*c* creates a matrix of the priority group hierarchy cross-referenced to message response hierarchy. Then, selecting a message response from the group of message responses in Step 106 includes sub-steps. Step 106*a* locates the calling party in a priority group. Step 106*b* selects a message response in reaction to locating the priority group.

Some aspects of the invention include further steps. Step 105 receives a calling party security code or other means of overriding the normal message response. In response to receiving the security code, Step 110 provides an override message response (regardless of the message response selected in Step 106).

In some aspects of the invention the mobile station includes a display mechanism or some other non-obtrusive alerting mechanism. Then, a further step, Step 112 shows the identity of the calling partying identity, regardless of the message response selected in Step 106.

In some aspects of the invention, creating a hierarchy of priority groups in Step 102*a* includes adding special identities to the hierarchy of priority groups. Creating a matrix of the priority group hierarchy cross-referenced to message response hierarchy in Step 102*c* includes cross-referencing the special identities to message responses. Then, selecting a message response from the group of message responses in Step 106 includes other sub-steps. Step 106*c*, prior to locating a calling party identity in a priority group, locates the calling party identity in the special identities. Step 106*d* selects a message response in reaction to locating the special identity.

Creating a plurality of message response groups in Step 103*a* includes creating a plurality of message response hierarchies. Then, the method includes a further step. Step 103*a*(1) creates matrices of the priority group hierarchy cross-referenced to each of the plurality of message response hierarchies. Then, selecting a message response group from the plurality of message response groups in Step 103*b* includes identifying the priority group-message response matrix to be used for cross-referencing the priority group in which the calling party identity is located.

In some aspects of the invention a further step, Step 114 edits the matrices to modify a the relationship between a priority group and a message response. Step 116 edits the matrices to modify the relationship between a calling party identity and a priority group.

When the mobile station includes a local memory, a microprocessor, and a software application of microprocessor instructions, the method comprises further steps. Step 103*a*(2) loads the selected priority group-message response matrix into the local memory. Then, Step 106*a* includes using the software application to locate the calling party in a priority group stored in the local memory. Step 106*b* selects a message response stored in the local memory.

In some aspects of the invention, the control and response functions are all substantially embedded in the mobile station. Then, a further step, Step 102*d* loads the priority group-message response matrices into local memory. Selecting a message response group from the plurality of message response groups in Step 103*b* includes using the software application to select a priority group-message response matrix from memory for use in cross-referencing the located priority group.

Alternately, a remote memory is used in the message control and response function. Then, Step 102*d* loads the priority group-message response matrices into the remote memory. Loading the priority group-message response matrix into local memory includes transmitting the message by wireless communication messages selected from the group including short message service (SMS) and general message services, such as WAP and HTTP data network subscriber protocols. Then, selecting a message response group from the plurality of message response groups in Step 103*b* includes loading a priority group-message response matrix into local memory from the remote memory for use in cross-referencing the located priority group.

In some aspects of the invention selecting a message response group from the plurality of message response groups in Step 103*b* includes the mobile station periodically requesting that the current priority group-message response matrix to be loaded into local memory from the remote memory, for use in cross-referencing the located priority group. Alternately, preceding the loading of the priority group-message response matrix into local memory, Step 102*d* includes the mobile station manually sending a request that the priority group-message response matrix be transmitted.

In some aspects of the invention, the remote memory has an Internet address. Then, selecting a message response group from the plurality of message response groups in Step 103*b* includes accessing the Internet address to load the priority group-message response matrix into local memory. When the mobile station includes a software browser application, selecting a message response group from the plurality of message response groups in Step 103*b* includes using the mobile station browser to access the Internet address through a wireless communications message.

In some aspects of the invention, editing the matrices to modify the relationship between a priority group and a message response in Step 114 includes accessing the remote memory through the Internet address. Likewise, editing the matrices to modify the relationship between a calling party identity and a priority group in Step 116 includes accessing the remote memory through the Internet address.

In some aspects of the invention the software application, microprocessor, and memory are located at a remote site. Then, Step 102*d* loads the priority group-message response matrices into remote memory. Selecting a message response group from the plurality of message response groups in Step 103*b* includes using the remote site software application to select a priority group-message response matrix from remote memory for use in cross-referencing the located priority group. Supplying the message response in Step 108 includes supplying the message response to the mobile station from the remote site.

The system and method of the present invention allows a telephone to modify its behavior and response to external events without immediate user intervention. This automatic customization permits more efficient use of the telephone. One application is the automatic silencing of the phone's audible ringer during times that have been previously selected by the user. Other applications permit the blocking of only certain callers during meetings, and other activities, that may warrant a modified response to incoming calls. Although examples of the present invention have been given in the context of a wireless communications network, the invention is equally applicable to landline and Internet telephones systems. Most of the examples depict the invention systems as being co-located with the mobile station. Some, or all, the control and message response functions can be performed at a site remote from the mobile station, however, such as by the service provider. Other variations and embodiments will occur to other skilled in the art in light of the above-mentioned examples.

I claim:

1. In a wireless communications network having at least one mobile station, a method for said mobile station to control the receipt of messages uniquely at each of said at least one mobile station from a remote calling party, the method comprising:
   providing said at least one mobile station;
   uniquely at each of said at least one mobile station:
      identifying a calling party;
      creating a plurality of message response groups:
      selecting a message response from the plurality of message response groups in response to the identity of the calling party; and
      supplying the selected message response;
   wherein selecting a message response group from the plurality of message response groups includes selecting a message response group in response to factors including the time of day communication activity level, and manual selection:
   wherein creating a group of message responses includes creating a hierarchy of message responses; and
   the method further comprising:
   creating a hierarchy of priority groups;
   inserting calling party identities into the priority groups;
   creating a matrix of the priority group hierarchy cross-referenced to message response hierarchy; and wherein selecting a message response from the group of message responses, in response to the identity of the calling party, includes:
locating the calling party in a priority group; and
selecting a message response in response to locating the priority group.

2. The method of claim 1 further comprising:
receiving a calling party security code;
in response to receiving the security code, providing an override message response.

3. The method of claim 1 wherein the mobile station has a display mechanism, and further comprising:
showing the identity of the calling party, regardless of the selected message response.

4. The method of claim 1 wherein creating a hierarchy of priority groups includes adding special identities to the hierarchy of priority groups;
wherein creating a matrix of the priority group hierarchy cross-referenced to message response hierarchy includes cross-referencing the special identities to message responses; and
wherein selecting a message response from the group of message responses, in response to the identity of the calling party, includes:
prior to locating a calling party identity in a priority group, locating the calling party identity in the special identities; and
selecting a message response in response to locating the calling party in the special identities.

5. The method of claim 4 wherein creating a plurality of message response groups includes creating a plurality of message response hierarchies; and
the method further comprising:
creating matrices of the priority group hierarchy cross-referenced to each of the plurality of message response hierarchies; and
wherein selecting a message response group from the plurality of message response groups includes identifying the priority group-message response matrix to be used for cross-referencing the located priority group.

6. The method of claim 5 further comprising:
editing the matrices to modify a relationship between a priority group and a message response.

7. The method of claim 6 further comprising:
editing the matrices to modify the relationship between a calling party identity and a priority group.

8. The method of claim 5 in which the mobile station includes a local memory, a microprocessor, and a software application of microprocessor instructions; and
the method further comprising:
loading the selected priority group-message response matrix into the local memory; and
wherein locating the calling party in a priority group includes locating the calling party in a priority group stored in the local memory; and
wherein selecting a message response in response to locating the priority group includes selecting a message response stored in the local memory.

9. The method of claim 8 further comprising:
loading the priority group-message response matrices into local memory; and
wherein selecting a message response group from the plurality of message response groups includes using the software application to select a priority group-message response matrix from memory for use in cross-referencing the located priority group.

10. The method of claim 8 wherein a remote memory is included, and further comprising:
loading the priority group-message response matrices into the remote memory; and
wherein selecting a message response group from the plurality of message response groups includes loading a priority group-message response matrix into local memory from the remote memory for use in cross-referencing the located priority group.

11. The method of claim 10 wherein selecting a message response group from the plurality of message response groups includes the mobile station periodically requesting that the current priority group-message response matrix be loaded into local memory from the remote memory.

12. The method of claim 10 wherein loading the priority group-message response matrix into local memory includes transmitting the message by wireless communication messages selected from the group including short message service (SMS) and general message service.

13. The method of claim 10 further comprising:
preceding the loading of the priority group-message response matrix into local memory, manually sending a request that the priority group-message response matrix be transmitted.

14. The method of claim 10 wherein the remote memory has an Internet address, and wherein selecting a message response group from the plurality of message response groups includes accessing the Internet address to load the priority group-message response matrix into local memory.

15. The method of claim 14 in which the mobile station includes a software browser application, and wherein selecting a message response group from the plurality of message response groups includes using the mobile station browser to access the Internet address through a wireless communications message.

16. The method of claim 14 wherein editing the matrices to modify the relationship between a priority group and a message response group includes accessing the remote memory through the Internet address; and
wherein editing the matrices to modify the relationship between a calling party identity and a priority group includes accessing the remote memory through the Internet address.

17. The method of claim 5 in which a remote site memory, software application of machine executable instructions, and microprocessor are included; and
the method further comprising:
loading the priority group-message response matrices into remote memory; and
wherein selecting a message response group from the plurality of message response groups includes using the remote site software application to select a priority group-message response matrix from remote memory for use in cross-referencing the located priority group; and
wherein supplying the message response includes supplying the message response to the mobile station from the remote site.

18. The method of claim 1 in which the wireless communication system provides Caller ID services; and
wherein identifying the calling party includes using the Caller ID service to identify the calling party.

19. The method of claim 1 wherein identifying a calling party includes determining a calling party identity from factors including the complete phone number, area code, unknown number, and blocked number.

20. In a wireless communications network having at least one mobile station, a system to control the receipt of messages uniquely at each of said at least one mobile station, the system comprising:
- at least one mobile station having a wireless communications port to accept calls, the mobile station including a microprocessor,
- software for application of machine executable instructions and
- a memory with a group of message responses, the mobile station having means for identifying a calling party and selecting a message response from the group of message responses; in response to the identity of the calling party;
- wherein the stored message response group is a message response group selected from a plurality of stored message response groups,
- wherein the mobile station further includes a switch;
- wherein the message response group stored in memory is selected in response to factors including the time of day, communication activity level, and manual selection using the switch;
- wherein the memory includes calling party identities being stored in priority groups; and
- wherein the software application creates a matrix of the priority group hierarchy cross-referenced to the message response hierarchy, the software application locating the calling party in a priority group, in response to the calling party being identified, and selecting a message response in reaction to locating the priority group.

21. The system of claim 20 wherein the mobile station memory includes an override priority group;
- wherein the mobile station receives a calling party security code to trigger the override priority group; and
- wherein the software application provides the override message response from memory in response to receiving the security code.

22. The system of claim 20 wherein the mobile station further includes a display; and
- wherein the software application shows the identity of the calling party on the display, regardless of the message response selected in reaction to locating the priority group.

23. The system of claim 20 wherein special identities to the hierarchy of priority groups are stored in memory and cross-referenced to message responses; and
- wherein the software application locates a calling party identity in the special identities and selects a message response in response to locating the special identity.

24. The system of claim 23 wherein the memory includes a plurality of message response hierarchies, and matrices of the priority group hierarchy cross-referenced to each of the plurality of message response hierarchies; and
- wherein the software application identifies the priority group-message response matrix to be used for cross-referencing the located priority group.

25. The system of claim 24 further comprising:
- a remote memory including matrices of priority group-message responses, the remote memory having a port to transmit wireless communications; and
- wherein the mobile station port accepts a priority group-message response matrix transmitted by the remote memory for storage in the mobile station memory.

26. The system of claim 25 wherein the mobile station software application periodically requests that the current priority group-message response matrix in a wireless transmission through the communications port; and
- wherein the remote memory transmits the current priority group-message response matrix to the mobile station in response to the request.

27. The system of claim 24 wherein the mobile station request of the priority group-message response matrix is transmitted with a wireless message selected from the group including short message service (SMS) and general message service; and
- wherein the remote memory transmits the priority group-message response matrix by wireless communication messages selected from the group including SMS and general message service.

28. The system of claim 24 wherein the mobile station switch is used to manually request the transmission of the priority group-message response matrix from the remote memory.

29. The system of claim 24 wherein the remote memory is accessible through an Internet address; and
- wherein the mobile station includes a browser to request the current priority group-message response matrix, via a wireless communications to the remote memory Internet address.

30. The system of claim 29 wherein the mobile station browser is used to access the remote memory, to edit the matrices, modifying the relationships between a priority group and a message response, and to modify the relationship between a calling party identity and a priority group.

31. In a wireless communications network having one or more mobile stations, a method for said mobile station to control the receipt of messages uniquely at each of said one or more mobile stations from a remote calling party, the method comprising:
- providing at each of said one or more mobile stations a local memory, a microprocessor, and a software application of microprocessor instructions;
- uniquely at each of said one or more mobile stations:
  - identifying a calling party;
  - creating a plurality of message response groups including a selected priority group-message response matrix;
  - selecting a message response from the plurality of message response groups in response to the identity of the calling party; and
  - supplying the selected message response;
- loading a selected priority group-message response matrix into the local memory;
- locating the calling party in the priority group-message response matrix;
- selecting a message response in response to locating the priority group stored in the local memory; and
- selecting a message response group from the plurality of message response groups includes using the software application to select a priority group-message response matrix from memory for use in cross-referencing the located priority group.

32. In a wireless communications network having one or more mobile stations, a method for said mobile station to control the receipt of messages uniquely at each of said one or more mobile station from a remote calling party, the method comprising:
- providing said one or more mobile stations including at each said one or more mobile stations a local memory, a microprocessor, and a software application of microprocessor instructions;

uniquely at each of said one or more mobile station:
  identifying a calling party;
  creating a plurality of message response groups including a selected priority group-message response matrix;
  selecting a message response from the plurality of message response groups in response to the identity of the calling party; and
  supplying the selected message response;
loading a selected priority group-message response matrix into the local memory;
locating the calling party in the priority group-message response matrix;
providing a remote memory; and
loading the priority group-message response matrices into the remote memory;
wherein selecting a message response group from the plurality of message response groups includes loading a priority group-message response matrix into local memory from the remote memory for use in cross-referencing the located priority group.

33. In a wireless communications network having one mobile stations, a system to control the receipt of messages uniquely at each of said one or more mobile stations, the system comprising:
  one or more mobile stations having a wireless communications port to accept calls, each of said one or more mobile stations including:
    a microprocessor,
    software for application of machine executable instructions;
    a memory at said mobile station with a group of message responses, the mobile station having means for identifying a calling party and selecting a message response from the group of message responses, in response to the identity of the calling party; and
  a remote memory including matrices of priority group-message responses, the remote memory having a port to transmit wireless communications;
  the mobile station port accepting a priority group-message response matrix transmitted by the remote memory for storage in the mobile station memory.

* * * * *